UNITED STATES PATENT OFFICE.

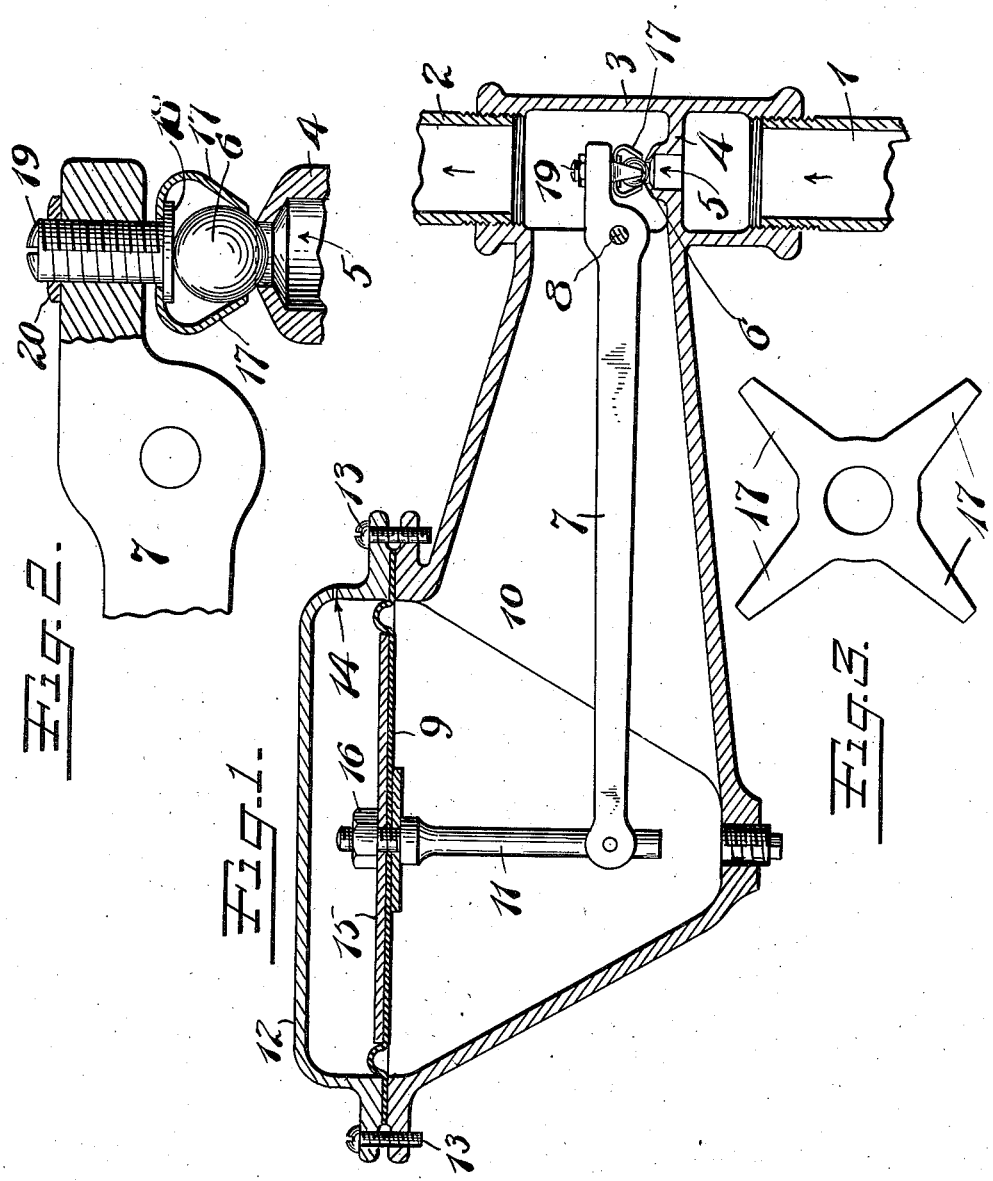

ROBERT N. BAYLIS, OF EAST ORANGE, NEW JERSEY.

FLUID-PRESSURE REGULATOR.

1,062,138.  Specification of Letters Patent.  Patented May 20, 1913.

Application filed January 14, 1913. Serial No. 741,925.

*To all whom it may concern:*

Be it known that I, ROBERT N. BAYLIS, a citizen of the United States, residing at East Orange, county of Essex, State of New Jersey, have invented certain new and useful Improvements in Fluid-Pressure Regulators, of which the following is a full, clear, and exact description.

My invention relates to an improved fluid pressure regulator.

In the accompanying drawings, Figure 1 is a vertical central sectional view. Fig. 2 is a relatively enlarged detail view, partly in section. Fig. 3 is a detail view.

1—2 represents the supply and distributing ends of a service pipe, through which gas flows in the direction of the arrows. These pipes 1 and 2 are coupled by an automatic regulating means to which my invention relates. This regulating means comprises a head 3 having therein a partition 4, through which there is a gas passage 5. This passage is provided with a valve 6. The valve 6 is a hardened and polished steel ball which is accurately fitted to a seat in the gas passage 5, so that it may properly close the latter when required. This ball valve 6 is carried by the short end of a lever 7, which is pivoted at 8 close to the valve 6. The other end of this lever is suitably connected with a diaphragm 9, which is carried by a housing 10, which extends laterally from the head 3. In this particular instance the connection between the lever 7 and the diaphragm 9 is a stem or link 11. The diaphragm may be secured to the otherwise open end of the housing 10 in any suitable manner, but preferably by means of a cover 12, which is suitably shaped to correspond with that end of the housing 10 closed by the diaphragm 8. By the use of clamping screws 13—13 the diaphragm 9 may be securely clamped between the cover 12 and the housing 10, the edges of the diaphragm forming a gas-tight joint or packing.

14 is a small vent to atmosphere in the cover 12.

15 represents a weight on the top of the diaphragm 9, that weight being appropriate for the particular pressure which it is desired to maintain. The weight 15 is preferably removable, being held in place by any suitable means such as a nut 16. Since the weight 15 is removable, other weights of different sizes may be substituted or added as the occasion requires.

The preferable means for mounting the valve 6 is best seen in the detail views, Figs. 2 and 3, in which it will be seen the valve is supported by light spring fingers 17—17, which extend partially under the ball so as to support it close to the underside of a hardened presser head 18 on an adjusting screw 19, which latter is threaded in the short end of the lever 7. When the valve 6 is in its closed position, the presser head will lie substantially parallel with the plane of the valve seat so that the point of contact on the ball holding it to its seat, will be substantially in the line of the axis of said valve seat, with the result that the pressure of said head against said ball valve will cause said valve to press uniformly entirely around the seat.

20 is a check nut for locking the adjusting screw 19 in a fixed position after adjustment.

The valve supporting fingers 17 are preferably formed by first forming a blank having radial arms, such as shown in Fig. 3, with a central perforation which slides over the screw 19, but of less diameter than the head 18, so that said blank will rest upon the head 18. These fingers 17 being yielding, permit the ball 6 to move laterally on the head 18 to such an extent as to properly seat in the gas passage 5 to close the same when desired. By making these fingers 17 of yielding material, accuracy of lateral positioning of the valve is unnecessary, since the ball can seek its own correct position when the presser head 18 is moved so as to force the ball against its seat to close the passage 5, the approximate positioning of said ball being attained by the use of the yielding supporting means.

The operation of the device will be readily understood. The moment an increased volume of gas is demanded, the tendency will be to exhaust the chamber 10 slightly, whereupon the diaphragm 9 will descend, the lever 7 moving in a direction to open the valve 6 just enough, when the diaphragm is properly weighted, to supply the needed addition. If there is a substantial decrease in gas being used, the diaphragm will rise and close down the passage 5 to the proper extent.

The pressure on the valve 6 being in a line with the axis of the valve seat, is bound to cause said valve to press uniformly entirely around the seat, thus guaranteeing a tight closure. While I have described this improved valve as employed in connection with a gas pressure regulator and operated by means of a lever as one convenient mechanical appliance for exerting power, it is obvious that in a broad sense the valve construction and its immediately associated parts may be employed in other connections and operated by other means so long as it embodies the characteristic features heretofore described.

While the preferred form of valve support is illustrated and described herein as embodying light spring fingers, it is obvious that other specific means may be employed so long as such means serves to so support the ball valve that it is capable of more or less lateral positioning underneath the presser head so that it can seek a center with relation to the valve seat, whereby its pressure against the valve seat will be uniform entirely around the latter which, broadly speaking, is the function of the particular form of ball support described herein.

What I claim is:

1. In a fluid pressure regulator, a head having a fluid passage therethrough, a ball valve for said passage arranged to seat at the edge of said passage, a diaphragm controlled means, a presser head for said ball, said presser head being carried by said diaphragm controlled means and being arranged to engage the ball on the opposite side from its seat, said ball being laterally movable on said head, and a ball centering means arranged to hold the same in substantially the proper position relatively to its seat.

2. In a fluid pressure regulator, a head having a fluid passage therethrough, a ball valve for said passage arranged to seat at the edge of said passage, a diaphragm controlled lever, a pivotal mounting therefor, an adjustable carrier for said ball, said carrier being mounted at one end of said lever and including a presser head for engaging the ball on the opposite side from its seat, upon which head said ball is laterally movable, and means coacting with said ball to hold it in substantially the proper position between said presser head and said seat, said means permitting said ball to move laterally sufficiently to find its seat.

ROBERT N. BAYLIS.

Witnesses:
IDA M. HUNZIKER,
E. E. MORSE.